(12) United States Patent
Yan (10) Patent No.: US 6,938,483 B1
(45) Date of Patent: Sep. 6, 2005

(54) PHASE-LOCKED MECHANICAL RESONATOR PAIR AND ITS APPLICATION IN MICROMACHINED VIBRATION GYROSCOPE

(76) Inventor: Hai Yan, 7136 Elsa Ct., Fontana, CA (US) 92336

( * ) Notice: Subject to any disclaimer, the term of this patent is extended or adjusted under 35 U.S.C. 154(b) by 0 days.

(21) Appl. No.: 10/708,847

(22) Filed: Mar. 28, 2004

(51) Int. Cl.[7] ............................................. G01C 19/00
(52) U.S. Cl. ................................. 73/504.04; 73/504.14
(58) Field of Search .................... 73/504.12, 504.13, 73/504.14, 504.15, 504.16, 504.02, 504.04

(56) References Cited

U.S. PATENT DOCUMENTS

| | | | |
|---|---|---|---|
| 5,349,855 A | 9/1994 | Bernstein et al. | 73/504.16 |
| 5,635,638 A | 6/1997 | Geen | 73/504.04 |
| 5,703,292 A * | 12/1997 | Ward | 73/504.02 |
| 5,895,850 A | 4/1999 | Buestgens | 73/504.12 |
| 6,122,961 A | 9/2000 | Geen et al. | 73/504.12 |
| 6,189,381 B1 | 2/2001 | Huang et al. | 73/504.12 |
| 6,230,563 B1 | 5/2001 | Clark et al. | 73/504.04 |
| 6,250,156 B1 | 6/2001 | Seshia et al. | 73/504.12 |
| 6,257,059 B1 | 7/2001 | Weinberg et al. | 73/504.16 |
| 6,393,913 B1 * | 5/2002 | Dyck et al. | 73/504.12 |
| 6,789,029 B2 * | 9/2004 | Rober | 702/76 |

* cited by examiner

Primary Examiner—Helen Kwok (57) ABSTRACT

This invention is related to a phase-locked mechanical resonator pair that comprises at least two mechanical resonators wherein the resonance of the second mechanical resonator is phase-locked to the resonance of the first mechanical, and a micromachined vibration gyroscope that uses such phase-locked mechanical resonator pair as its resonating masses to generate differential Coriolis forces and to achieve inertial cancellation.

9 Claims, 6 Drawing Sheets

DR: driving port
DF: driving feedback port
FA: frequency adjustment port

Fig. 3 (Present Invention)

Fig. 4 (Present Invention)

Fig. 5 (Present Invention)

Fig. 6 (Present Invention)

PHASE-LOCKED MECHANICAL RESONATOR PAIR AND ITS APPLICATION IN MICROMACHINED VIBRATION GYROSCOPE

CROSS REFERENCE TO RELATED APPLICATIONS

U.S. PATENT DOCUMENTS: U.S. Pat. No. 5,349,855, Bernstein, et al., Sep. 27, 1994, 73/504.16; U.S. Pat. No. 5,635,638, Geen, Jun. 3, 1997, 73/504.04; U.S. Pat. No. 6,122,961, Geen et al., Sep. 26, 2000, 73/504.12; U.S. Pat. No. 5,895,850, Buestgens, Apr. 20, 1999, 73/504.12; U.S. Pat. No. 6,230,563, Clark, et al., May 15, 2001, 73/504.04; U.S. Pat. No. 6,250,156, Seshia, et al., Jun. 26, 2001, 73/504.12; U.S. Pat. No. 6,257,059, Weinberg, et al., Jul. 10, 2001, 73/504.16; U.S. Pat. No. 6,189,381, Huang, et al., Feb. 20, 2001, 73/504.12; U.S. Pat. No. 5,349,855, Bernstein, et al., Sep. 27, 1994, 73/504.16; INTERNATIONAL PATENT DOCUMENTS: WO 98/37380, Ward et al., Aug. 27, 1998, G01C 19/00; WO 98/22827, Weinberg et al., May 28, 1998, G01P 9/04; WO 99/12002, Geen et al., Mar. 11, 1999, G01C 19/56; WO 99/19734, Hsu et al., Apr. 22, 1999, G01P 9/00; OTHER PUBLICATIONS: Floyd Martin Gardner, "Phase-lock Techniques," (ISBN 0-471-04294-3), 1979; William Albert Clark, "Micromachined Vibratory Rate Gyroscope," Doctoral Thesis, University of California, Berkeley, 1994; Sergio Franco, "Design with Operational Amplifiers and Analog Integrated Circuits," (ISBN 0-07-021799-8), 1988.

SUMMARY OF INVENTION

This invention is related to a phase-locked mechanical resonator pair that comprises at least two mechanical resonators wherein the resonance of the second mechanical resonator is phase-locked to the resonance of the first mechanical, and a micromachined vibration gyroscope that uses such phase-locked mechanical resonator pair as its resonating masses to generate differential Coriolis forces and to achieve inertial cancellation.

DETAILED DESCRIPTION

Figure 1:
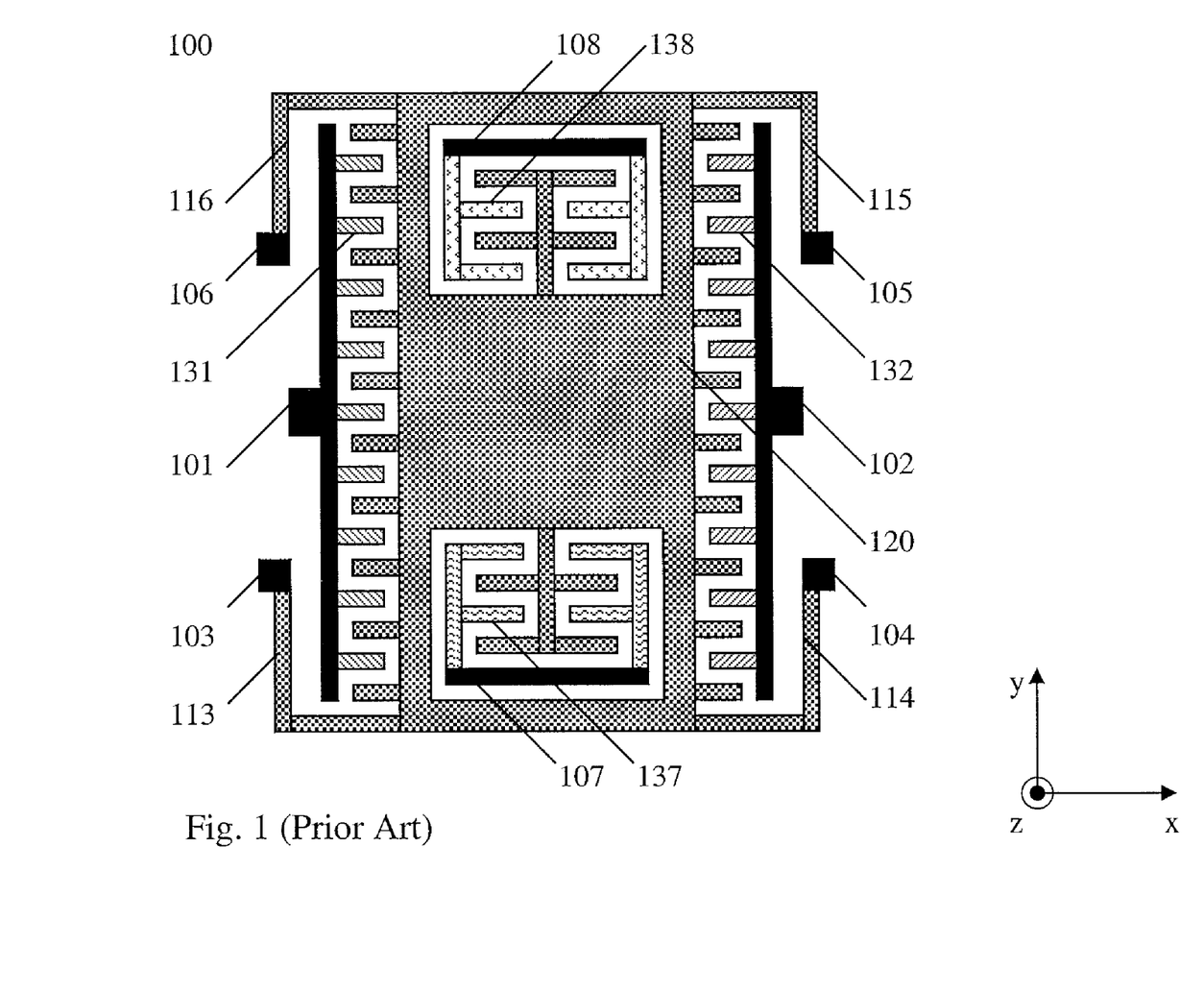
FIG. 1 is a plan view of a prior art: a micromachined vibration gyroscope that is similar in principal to known gyroscopes.

FIG. 1 is a plan view of a prior art: a micromachined vibration gyroscope that is similar in principal to known gyroscopes.

Movable structure 120 is suspended over substrate 100 and supported by beams 113–116. One end of each of the beams 113–116 is anchored on the substrate through anchors 103–106, respectively. Elements 131, 132, 137, and 138 are fixed structures anchored on the substrate 100 through anchors 101, 102, 107, and 108, respectively. Element 131 and element 120 form a comb-driver. Element 132 and element 120 form a comb-like capacitor. Element 137, element 138, and element 120 form two parallel-plate capacitors.

The movable structure 120 is driven by the comb-driver formed by element 131 and 120 to resonate along the x-axis. The resonance causes capacitance changing of the comb-like capacitor formed by element 132 and element 120, which reflects the amplitude, frequency, and phase of the resonance. Such capacitance changing is detected by external circuit and is used to control the resonance of the movable structure 120.

A Coriolis force along the y-axis is generated on the movable structure 120 when the device experiences a rotation about the z-axis. The Coriolis force causes the movable structure 120 to resonate along the y-axis in addition to the resonance along the x-axis. The resonance along the y-axis further causes capacitance changing of the parallel-plate capacitors formed by element 137, element 138, and element 120. Such capacitance changing is detected by external circuit as indication of the rotation rate.

The design shown in FIG. 1 utilizes only one movable structure as the resonating mass. Thus the driving momentum balance for inertial cancellation is not satisfied, i.e., while the movable structure 120 resonates along the x-axis, it injects energy to the mounting point of the device. Part of the injected energy is reflected back to the device and affects the readout of the device. Such effect is not desirable because in this case the performance of the device varies as the device mounting condition changes. Another disadvantage of utilizing only one movable structure as the resonating mass is that the generation of the Coriolis force is not differential in this case. Thus some common-mode disturbances such as acceleration in the y-axis may significantly affect the readout.

Figure 2:
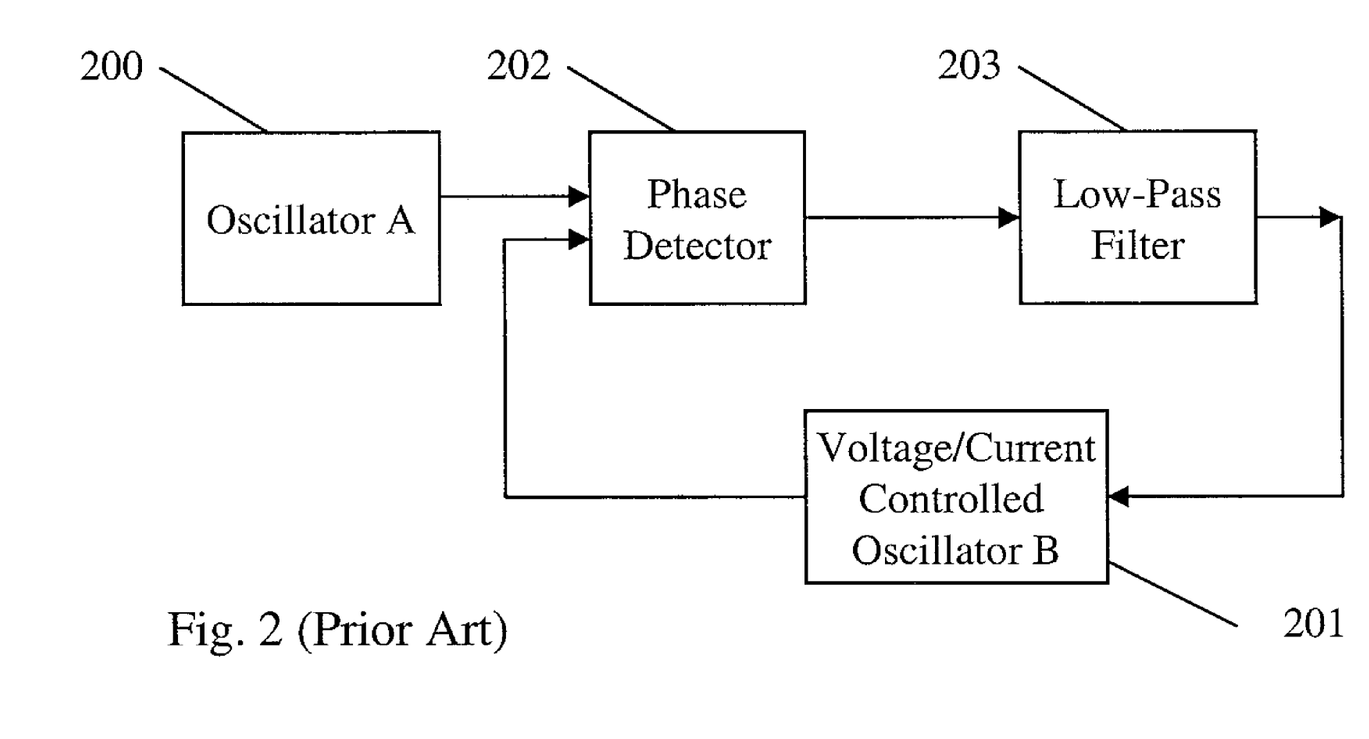
FIG. 2 is a block diagram of a prior art: a phase-lock loop that is used to lock the phases of two electrical signals in the circuit design.

FIG. 2 shows a block diagram of a prior art: a phase-lock loop that is used to lock the phases of two electrical signals in the circuit design.

The phase-lock loop typically comprises elements 200 (Oscillator A), 201 (Voltage/Current Controlled Oscillator B), 202 (Phase Detector), 203 (Low-Pass Filter). The "Phase Detector" 202 detects the phase difference of the two out-put signals from "Oscillator A" 200 and "Voltage/Current Controlled Oscillator B" 201. The "Low-Pass Filter" 203 filters out the high frequency components of the out-put signal of "Phase Detector" 202 and passes the low frequency components of the signal, which reflects the phase difference of the output signal of "Oscillator A" 200 and the output signal of "Voltage/Current Controlled Oscillator B" 201, to the input of "Voltage/Current Controlled Oscillator B"201, which controls the oscillation frequency of "Voltage/Current Controlled Oscillator B" 201. A control loop is thus formed. The control loop tends to maintain the phase difference to be certain fixed value, which depends on the characteristics of the control loop. In case the phase difference varies from that fixed value, the control loop detects such variation and automatically adjusts the oscillation frequency of "Voltage/Current Controlled Oscillator B" 201 to pull the phase difference back to that fixed value. At stable status, the oscillations of the two oscillators are synchronized to each other with a stable phase difference.

Figure 3:
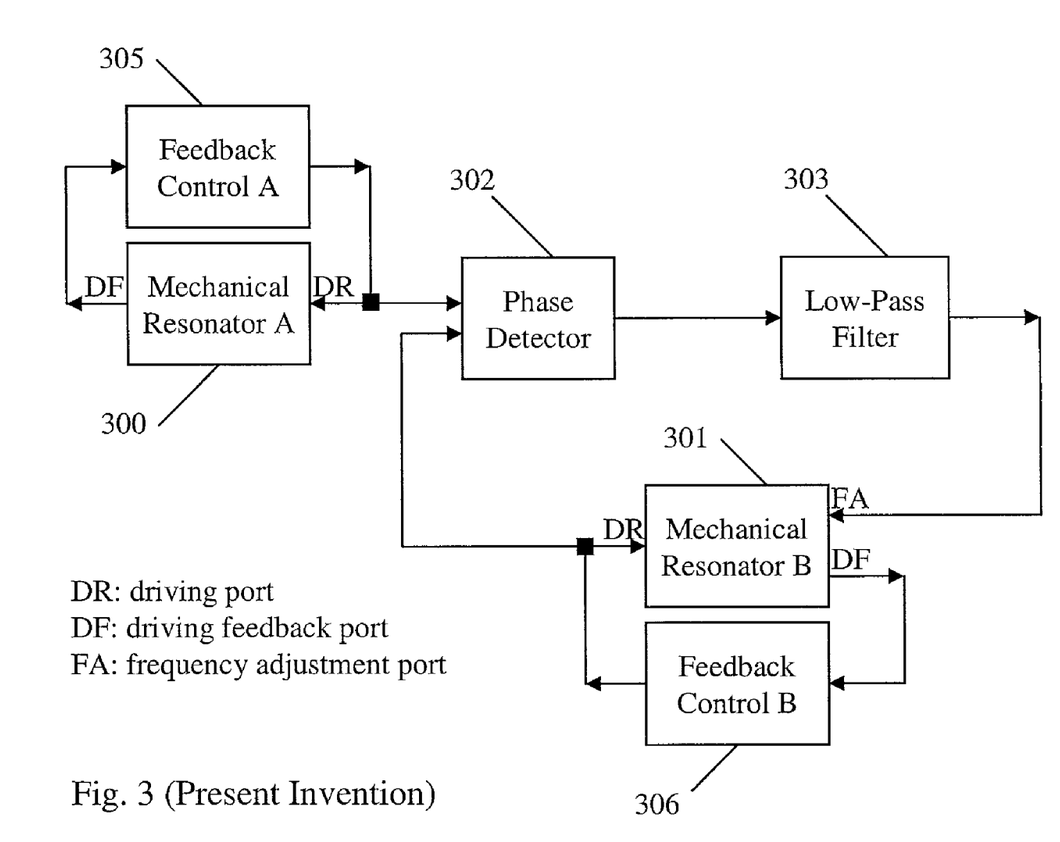
FIG. 3 is a block diagram that describes the principal of the phase-locked mechanical resonator pair (present invention) according to one of its embodiments.

FIG. 3 is a block diagram that describes the principal of the phase-locked mechanical resonator pair (present invention) according to one of its embodiments.

Element 300 is a mechanical resonator, which has at least a driving port that is used to drive the mechanical resonator to resonate, and a driving feedback port that outputs signals that reflect the status of the resonance (such as amplitude, frequency, and phase of the resonance).

Element 305 is a feedback control circuit, of which the function is to maintain a feedback loop between the driving feedback port and the driving port of the mechanical resonator 300 and to drive the mechanical resonator 300 to resonate at or close to its natural resonant frequency.

Element 301 is a mechanical resonator, which has at least a driving port that is used to drive the mechanical resonator to resonate, a driving feedback port that outputs signals that reflect the status of the resonance (such as amplitude, frequency, and phase of the resonance), and a frequency adjustment port through which the natural resonant frequency of the mechanical resonator can be adjusted by applying a signal on said frequency adjustment port.

Element 306 is a feedback control circuit, of which the function is to maintain a feedback loop between the driving feedback port and the driving port of the mechanical resonator 301 and to drive the mechanical resonator 301 to resonate at or close to its natural resonant frequency.

Element 302 is a phase detector, which has the same function as a phase detector used in a typical phase-lock loop (such as element 202 in FIG. 2).

Element 303 is a low-pass filter, which has the same function as a low-pass filter used in a typical phase-lock loop (such as element 203 in FIG. 2).

The "Phase Detector" 302 detects the phase difference of the two output signals from "Feedback Control A" 305 and "Feedback Control B" 306. The "Low-Pass Filter" 303 filters out the high frequency components of the output signal of "Phase Detector" 302 and passes the low frequency components of the signal, which reflects the phase difference between the resonance of "Mechanical Resonator A" 300 and the resonance of "Mechanical Resonator B" 301, to the frequency adjustment port of "Mechanical Resonator B" 301, which adjusts the natural resonant frequency of "Mechanical Resonator B" 301. A control loop is thus formed. The control loop tends to maintain the phase difference between the resonance of "Mechanical Resonator A" 300 and the resonance of "Mechanical Resonator B" 301 to be certain fixed value, which depends on the characteristics of the control loop. In case the phase difference varies from that fixed value, the control loop detects such variation and automatically adjusts the natural resonant frequency of "Mechanical Resonator B" 301 to pull the phase difference back to that fixed value. At stable status, the resonances of the two mechanical resonators are synchronized to each other with a stable phase difference.

Figure 4:
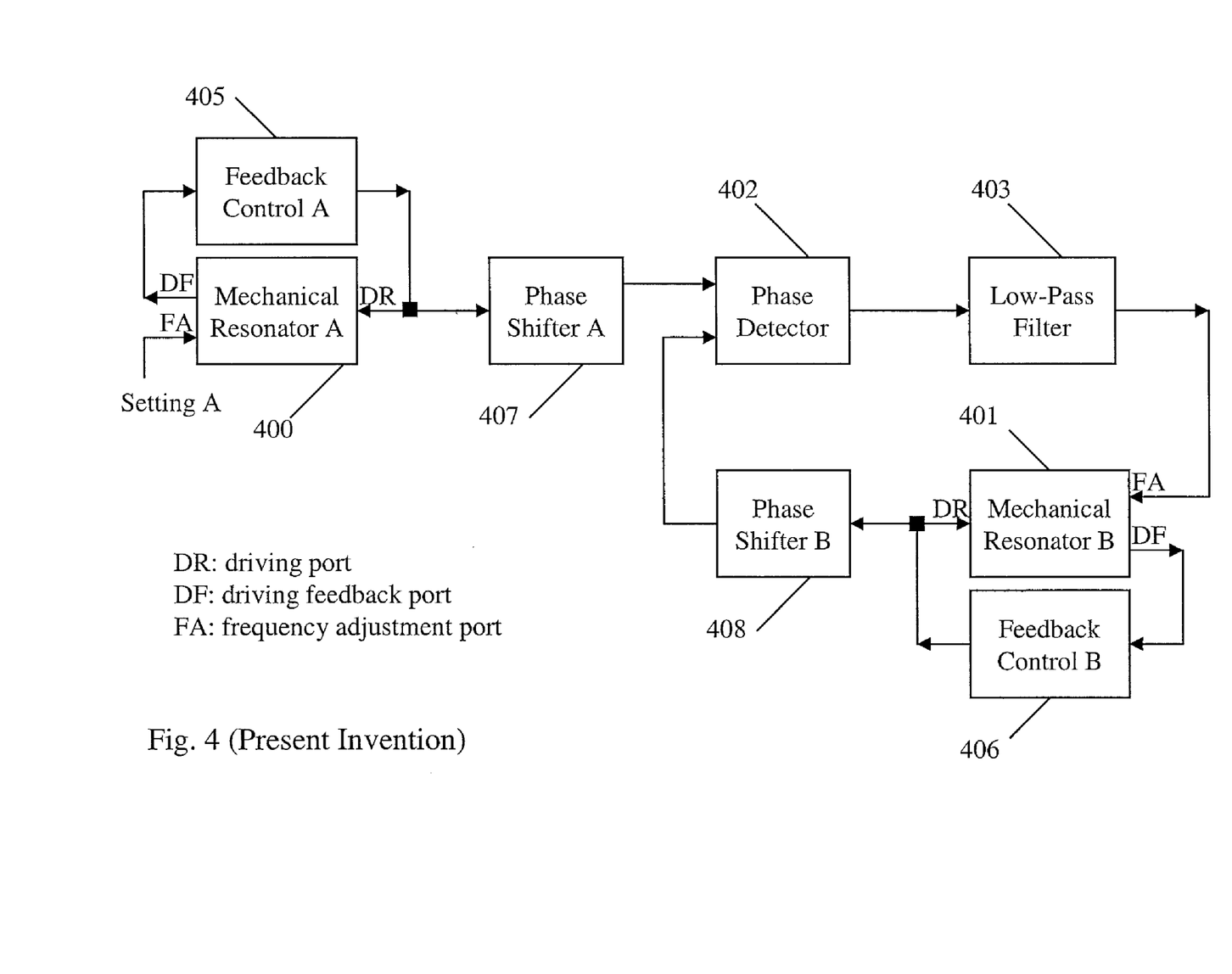
FIG. 4 is a block diagram that shows another embodiment of the phase-locked mechanical resonator pair (present invention).

FIG. 4 is a block diagram that shows another embodiment of the phase-locked mechanical resonator pair (present invention).

Element 400 and Element 401 are two mechanical resonators, each of which has at least a driving port that is used to drive the mechanical resonator to resonate, a driving feedback port that outputs signals that reflect the status of the resonance (such as amplitude, frequency, and phase of the resonance), and a frequency adjustment port through which the natural resonant frequency of the mechanical resonator can be adjusted by applying a signal on said frequency adjustment port. By applying a signal "Setting A" on the frequency adjustment port of "Mechanical Resonator A" 400, the natural resonant frequency of "Mechanical Resonator A" 400 can be preset to be within the adjustable range of the natural resonant frequency of "Mechanical Resonator B" 401 so that a phase-lock between the resonances of the two mechanical resonators can occur.

Element 405 is a feedback control circuit, of which the function is to maintain a feedback loop between the driving feedback port and the driving port of "Mechanical Resonator A" 400 and to drive "Mechanical Resonator A" 400 to resonate at or close to its natural resonant frequency.

Element 406 is a feedback control circuit, of which the function is to maintain a feedback loop between the driving feedback port and the driving port of "Mechanical Resonator B" 401 and to drive "Mechanical Resonator B" 401 to resonate at or close to its natural resonant frequency.

Element 402 is a phase detector, which has the same function as a phase detector used in a typical phase-lock loop (such as element 202 in FIG. 2).

Element 403 is a low-pass filter, which has the same function as a low-pass filter used in a typical phase-lock loop (such as element 203 in FIG. 2).

Element 407 and element 408 are phase-shifters that have the same function as a typical phase-shifter used in circuit design to shifter the phase of a signal. The functions of these two phase-shifters are to adjust the phases of the output signals from "Feedback Control A" 405 and "Feedback Control B" 406 so that the after-lock phase difference between the resonance of "Mechanical Resonator A" 400 and the resonance of "Mechanical Resonator B" 401 can be adjusted.

The "Mechanical Resonator A" 400 is driven by "Feedback Control A" 405 to resonate at or close to its natural resonant frequency. The "Mechanical Resonator B" 401 is driven by "Feedback Control B" 406 to resonate at or close to its natural resonant frequency. The "Phase Shifter A" 407 shifts the phase of the output signal of "Feedback Control A" 405. The "Phase Shifter B" 408 shifts the phase of the output signal of "Feedback Control B" 406. The outputs of "Phase Shifter A" 407 and "Phase Shifter B" 408 are passed to "Phase Detector" 402. The "Phase Detector" 402 detects the phase difference of the two output signals from "Phase Shifter A" 407 and "Phase Shifter B" 408. The "Low-Pass Filter" 403 filters out the high frequency components of the output signal of "Phase Detector" 402 and passes the low frequency components of the signal, which reflects the phase difference of the two mechanical resonators (i.e., "Mechanical Resonator A" 400 and "Mechanical Resonator B" 401), to the frequency adjustment port of "Mechanical Resonator B" 401, which adjusts the natural resonant frequency of "Mechanical Resonator B" 401. A control loop is thus formed. The control loop tends to maintain the phase difference between the resonance of "Mechanical Resonator A" 400 and the resonance of "Mechanical Resonator B" 401 to be certain fixed value, which depends on the characteristics of the control loop and the characteristics of the phase-shifters. In case the phase difference varies from that fixed value, the control loop detects such variation and automatically adjusts the natural resonant frequency of "Mechanical Resonator B" 401 to pull the phase difference back to that fixed value. At stable status, the resonances of the two mechanical resonators are synchronized to each other with a stable phase difference.

Figure 5:
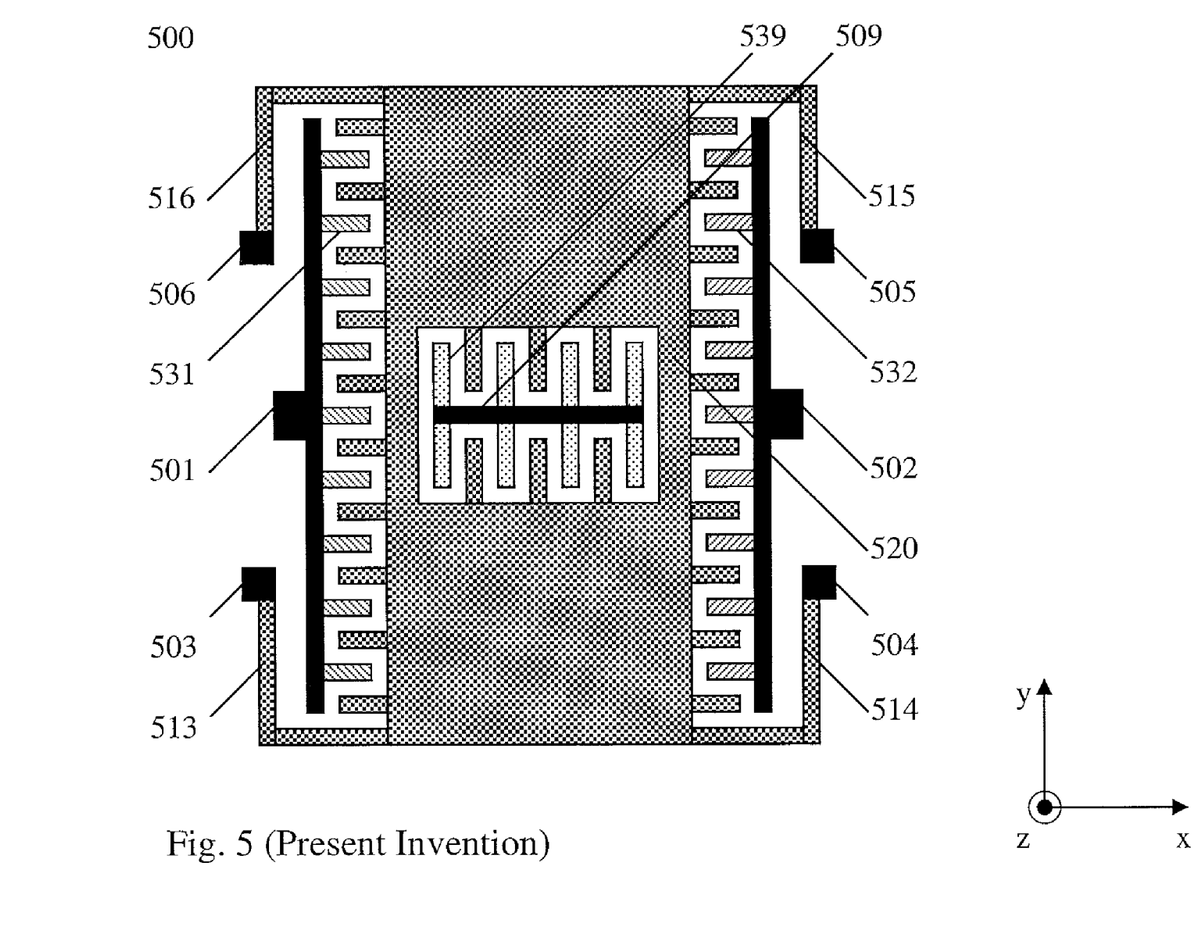
FIG. 5 is a plan view of one of the embodiments of the mechanical resonator in the phase-locked mechanical resonator pair (present invention).

FIG. 5 is a plan view of one of the embodiments of the mechanical resonator in the phase-locked mechanical resonator pair (present invention).

Movable structure 520 is suspended over substrate 500 and supported by beams 513–516. One end of each of the beams 513–516 is anchored on the substrate through anchors 503–506, respectively. Elements 531, 532 and 539 are fixed structures anchored on the substrate 500 through anchors 501, 502 and 509, respectively. Element 531 and element 520 form a comb-driver. Element 532 and element 520 form a comb-like capacitor. Element 539 and element 520 form a parallel-plate capacitor.

The movable structure 520 is driven by the comb-driver formed by element 531 and 520 to resonate along the x-axis. The resonance causes capacitance changing of the comb-like capacitor formed by element 532 and element 520, which reflects the amplitude, frequency, and phase of the resonance. Such capacitance changing is detected by external circuit and is used to control the resonance of the movable structure 520.

The natural resonant frequency of the movable structure 520 is mainly determined by the supporting beams 513–516. It can be further adjusted by applying a voltage between the two electrodes of the capacitor formed by element 539 and the movable structure 520. When such a voltage is applied, an electrostatic force, of which the value is a function of the relative position of the two electrodes, is generated and applied on the movable structure 520. In the case that element 539 and element 520 form a parallel-plate capacitor, the electrostatic force has a component that is linear to the relative position of the two electrodes, which can be approximately expressed as:

$$F=kx$$

Where:

$$k=-V*V*e0*er*A/(d0*d0*d0);$$

V is the voltage applied between the electrodes;
e0 is the vacuum permittivity;
er is the relative permittivity;
A is the effective area of the parallel-plate capacitor;
d0 is the as-fabricated gap distance of the parallel-plate capacitor;
x is the displacement of the movable structure 520 relative to the substrate 500.

Compared to the force-displacement relationship of a mechanical spring, which is typically also expressed as F=kx, the linear component of the electrostatic force acts as a spring constant. The total spring constant for the movable structure 520 is a sum of such spring constant caused by the electrostatic force and the mechanical spring constant defined by the mechanical supporting beams 513–516. Thus by applying a voltage between the two electrodes of the capacitor formed by element 539 and the movable structure 520, the natural resonant frequency of the movable structure 520 can be adjusted.

In application, the electrical connection to element 501 can be used as the driving port, the electrical connection to element 502 can be used as the driving feedback port, and the electrical connection to element 509 can be used as the frequency adjustment port. In case the frequency adjustment port is not needed, element 509 can be tied to a fixed voltage or to the same potential of element 520.

A mechanical resonator pair can be formed by two of the mechanical resonators interpreted in FIG. 5. With the additional circuit blocks interpreted in FIG. 3 or FIG. 4, the resonances of the two mechanical resonators can be phase-locked to each other with certain preset phase difference.

Figure 6:
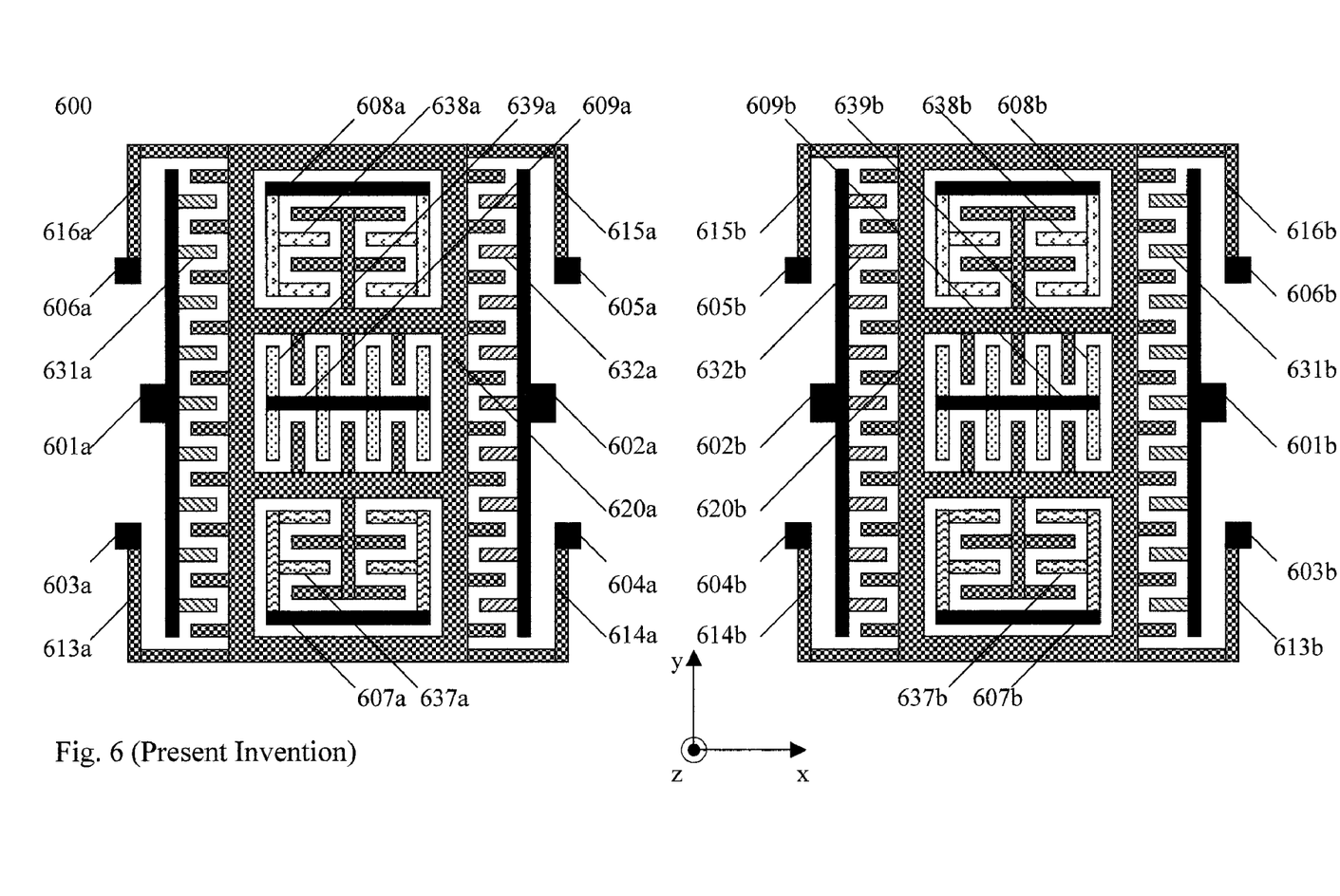
FIG. 6 is a plan view of one of the embodiments of a micromachined vibration gyroscope that uses the phase-locked mechanical resonator pair as its resonating masses (present invention).

FIG. 6 is a plan view of one of the embodiments of a micromachined vibration gyroscope that uses the phase-locked mechanical resonator pair as its resonating masses (present invention).

The embodiment comprises two symmetric or close-to-symmetric sub-gyroscopes, i.e., gyro-A and gyro-B, built on substrate 600 and placed side by side on substrate 600. In FIG. 6, elements for gyro-A are numbered with suffix "a" while elements for gyro-B are numbered with suffix "b".

Elements 601a–606a, 609a, 613a–616a, 620a, 631a, 632a, and 639a in FIG. 6 have the same functions as or similar functions to elements 501–506, 509, 513–516, 520, 531, 532, and 539 in FIG. 5, respectively. Elements 637a and 638a are fixed structures anchored on the substrate through anchors 607a, and 608a, respectively. Element 637a, element 638a, and element 620a form two capacitors, preferably parallel-plate capacitors.

The movable structure 620a is driven by the comb-driver formed by element 631a and 620a to resonate along the x-axis. The resonance causes capacitance changing of the capacitor formed by element 632a and element 620a, which reflects the amplitude, frequency, and phase of the resonance along the x-axis. Such capacitance changing is detected by external circuit and is used to control the resonance of the movable structure 620 along the x-axis.

A Coriolis force along the y-axis is generated on the movable structure 620a when the device experiences a rotation about the z-axis. The Coriolis force causes the movable structure 620a to resonate along the y-axis in addition to the resonance along the x-axis. The resonance along the y-axis further causes capacitance changing of the capacitors formed by element 637a, element 638a, and element 620a. Such capacitance changing is detected by external circuit as indication of the rotation rate.

Optionally, while the capacitor formed by element 637a and element 620a is used as a detection capacitor to sense the resonance along the y-axis caused by the Coriolis force, the capacitor formed by element 638a and element 620a can be used as an electrostatic driver to achieve force-balancing, i.e., the generated Coriolis force along y-axis is cancelled by another force along y-axis so that the movable structure 620a moves only insignificantly along the y-axis. By accordingly applying a voltage between element 638a and element 620a, an electrostatic force along y-axis can be generated on the movable structure 620a to cancel the Coriolis force along the y-axis. In this case, the voltage applied between element 638a and 620a can be output as indication of the rotation rate.

Gyro-B is symmetric or close-to-symmetric to Gyro-A. Gyro-B works in the same way as or similar way to Gyro-A.

With the additional circuit blocks interpreted in FIG. 3 or FIG. 4, the x-axis resonances of the two resonating masses (i.e., movable structures 620a and 620b) can be phase-locked to each other with 180-degree or close to 180-degree phase difference. When the amplitudes of the x-axis resonances are controlled to be the same, or close to be the same, the driving momentum balance for inertial cancellation can be satisfied, i.e., the movable structure 620a and 620b inject no or insignificant net energy to the mounting point of the device while they resonate along the x-axis. Furthermore, the generation of the Coriolis forces is differential. Thus the common-mode disturbances such as acceleration in the y-axis will not significantly affect the readout.

What is claimed is:
1. A mechanical resonator pair comprising, at least:
    a first mechanical resonator comprising, at least:
        a resonating mass;
        a driving mechanism through which the resonating mass of said first mechanical resonator is driven to resonate along a pre-selected axis;

a driving feedback mechanism that provides status information of the resonance of said first mechanical resonator along the pre-selected axis wherein the status information of the resonance includes amplitude, frequency, and phase of the resonance;

a second mechanical resonator with the resonance of said second mechanical resonator phase-locked to the resonance of said first mechanical resonator with certain preset phase difference comprising, at least:

a resonating mass;

a driving mechanism through which the resonating mass of said second mechanical resonator is driven to resonate along the same pre-selected axis of said first mechanical resonator;

a driving feedback mechanism that provides status information of the resonance of said second mechanical resonator along the pre-selected axis wherein the status information of the resonance includes amplitude, frequency, and phase of the resonance;

a frequency adjustment mechanism through which a natural resonant frequency for the resonance along the pre-selected axis of said second mechanical resonator can be adjusted by a signal.

2. A mechanical resonator pair of claim 1, further comprising, at least:

a circuitry that enables the phase-locking between the resonance of the first mechanical resonator and the resonance of the second mechanical resonator with certain preset phase difference comprising, at least:

a feedback control block that enables the first mechanical resonator to resonate along the pre-selected axis at or close to a natural resonant frequency of said first mechanical resonator;

a feedback control block that enables the second mechanical resonator to resonate along the pre-selected axis at or close to the natural resonant frequency of said second mechanical resonator;

a control loop that enables the phase-locking between the resonance of the first mechanical resonator and the resonance of the second mechanical resonator with certain preset phase difference by detecting the phase difference between the resonances and accordingly adjusting the natural resonant frequency of the second mechanical resonator through the frequency adjustment mechanism of the second mechanical resonator.

3. A mechanical resonator pair according to claim 1, wherein:

the resonating mass of the first mechanical resonator is a movable structure suspended over a substrate and supported by a set of mechanical beams, with at least one point of each of the mechanical beams anchored on the substrate;

the driving mechanism of the first mechanical resonator is implemented by an electrostatic force applied on the resonating mass of the first mechanical resonator through a set of electrodes placed near the resonating mass of the first mechanical resonator and anchored on the substrate;

the driving feedback mechanism of the first mechanical resonator is implemented by capacitive sensing with one or more capacitors formed by the resonating mass of the first mechanical resonator and a set of electrodes placed near the resonating mass of the first mechanical resonator and anchored on the substrate;

the resonating mass of the second mechanical resonator is a movable structure suspended over the same substrate of the first mechanical resonator and supported by a set of mechanical beams, with at least one point of each of the mechanical beams anchored on the substrate;

the driving mechanism of the second mechanical resonator is implemented by an electrostatic force applied on the resonating mass of the second mechanical resonator through a set of electrodes placed near the resonating mass of the second mechanical resonator and anchored on the substrate;

the driving feedback mechanism of the second mechanical resonators is implemented by capacitive sensing with one or more capacitors formed by the resonating mass of the second mechanical resonator and a set of electrodes placed near the resonating mass of the second mechanical resonator and anchored on the substrate;

the frequency adjustment mechanism of the second mechanical resonator is implemented by an electrostatic force applied on the resonating mass of the second mechanical resonator through a set of electrodes placed near the resonating mass of the second mechanical resonator and anchored on the substrate, with the electrostatic force having a component that is linear to the relative position of the resonating mass of the second mechanical resonator and the substrate.

4. A mechanical resonator pair according to claim 2, wherein:

the resonating mass of the first mechanical resonator is a movable structure suspended over a substrate and supported by a set of mechanical beams, with at least one point of each of the mechanical beams anchored on the substrate;

the driving mechanism of the first mechanical resonator is implemented by an electrostatic force applied on the resonating mass of the first mechanical resonator through a set of electrodes placed near the resonating mass of the first mechanical resonator and anchored on the substrate;

the driving feedback mechanism of the first mechanical resonator is implemented by capacitive sensing with one or more capacitors formed by the resonating mass of the first mechanical resonator and a set of electrodes placed near the resonating mass of the first mechanical resonator and anchored on the substrate;

the resonating mass of the second mechanical resonator is a movable structure suspended over the same substrate of the first mechanical resonator and supported by a set of mechanical beams, with at least one point of each of the mechanical beams anchored on the substrate;

the driving mechanism of the second mechanical resonator is implemented by an electrostatic force applied on the resonating mass of the second mechanical resonator through a set of electrodes placed near the resonating mass of the second mechanical resonator and anchored on the substrate;

the driving feedback mechanism of the second mechanical resonators is implemented by capacitive sensing with one or more capacitors formed by the resonating mass of the second mechanical resonator and a set of electrodes placed near the resonating mass of the second mechanical resonator and anchored on the substrate;

the frequency adjustment mechanism of the second mechanical resonator is implemented by an electrostatic force applied on the resonating mass of the second mechanical resonator through a set of electrodes placed near the resonating mass of the second mechanical resonator and anchored on the substrate, with the electrostatic force having a component that is linear to the relative position of the resonating mass of the second mechanical resonator and the substrate;

the control loop of the circuitry is implemented by a loop that comprises at least a phase-detector, a low-pass filter, and the feedback control block that enables the second mechanical resonator to resonate along the pre-selected axis at or close to the natural resonant frequency of said second mechanical resonator.

5. A mechanical resonator pair according to claim 2, wherein:

the resonating masses of the first and second mechanical resonators are used as the resonating masses to generate the Coriolis force in a vibration gyroscope utilizing Coriolis Effect.

6. A vibration gyroscope utilizing Coriolis Effect comprising, at least:

a first movable mass resonating at or close to a natural resonate frequency of said first movable mass along a pre-selected axis, where the resonance of said first movable mass along said pre-selected axis is to generate a Coriolis force when there is a rotation about an axis that is perpendicular to said pre-selected axis;

a driving mechanism that drives the first movable mass to resonate along the pre-selected axis;

a driving feedback mechanism that provides status information of the resonance of the first movable mass along the pre-selected axis wherein the status information of the resonance includes amplitude, frequency, and phase of the resonance;

a second movable mass resonating at or close to a natural resonate frequency of said second movable mass along the same pre-selected axis of the first movable mass, with the resonance of said second movable mass phase-locked to the resonance of the first movable mass with certain preset phase difference, preferably 180 degree or close to 180 degree;

a driving mechanism that drives the second movable mass to resonate along the pre-selected axis;

a driving feedback mechanism that provides status information of the resonance of the second movable mass along the pre-selected axis wherein the status information of the resonance includes amplitude, frequency, and phase of the resonance;

a frequency adjustment mechanism that adjusts the natural resonant frequency of the second movable mass for the resonance along the pre-selected axis.

7. A vibration gyroscope of claim 6, further comprising:

a circuitry that enables the phase-locking between the resonance of the first movable mass along the pre-selected axis and the resonance of the second movable mass along the pre-selected axis with certain preset phase difference comprising, at least:

a feedback control block that enables the first movable mass to resonate along the pre-selected axis at or close to the natural resonant frequency of said first movable mass;

a feedback control block that enables the second movable mass to resonate along the pre-selected axis at or close to the natural resonant frequency of said second movable mass;

a control loop that enables the phase-locking between the resonance of the first movable mass along the pre-selected axis and the resonance of the second movable mass along the pre-selected axis with certain preset phase difference, preferably 180 degree or close to 180 degree, by detecting the phase difference between the resonances and accordingly adjusting the natural resonant frequency of the second movable mass through the frequency adjustment mechanism of the second movable mass.

8. A vibration gyroscope of claim 6, wherein:

the first movable mass is a movable structure suspended over a substrate and supported by a set of mechanical beams, with at least one point of each of the mechanical beams anchored on the substrate;

the driving mechanism for the first movable mass is implemented by an electrostatic force between the first movable mass and a first set of electrodes placed near the first movable mass and anchored on the substrate;

the driving feedback mechanism for the first movable mass is implemented by capacitive sensing with one or more capacitors formed by the first movable mass and a second set of electrodes placed near the first movable mass and anchored on the substrate;

the second movable mass is a movable structure suspended over the same substrate of the first movable mass and supported by a set of mechanical beams, with at least one point of each of the mechanical beams anchored on the substrate;

the driving mechanism for the second movable mass is implemented by an electrostatic force between the second movable mass and a third set of electrodes placed near the second movable mass and anchored on the substrate;

the driving feedback mechanism for the second movable mass is implemented by capacitive sensing with one or more capacitors formed by the second movable mass and a fourth set of electrodes placed near the second movable mass and anchored on the substrate;

the frequency adjustment mechanism for the second movable mass is implemented by an electrostatic force applied on the second movable mass through a fifth set of electrodes placed near the second movable mass and anchored on the substrate, with the electrostatic force having a component that is linear to the relative position of the second movable mass and the substrate.

9. A vibration gyroscope of claim 7, wherein:

the first movable mass is a movable structure suspended over a substrate and supported by a set of mechanical beams, with at least one point of each of the mechanical beams anchored on the substrate;

the driving mechanism for the first movable mass is implemented by an electrostatic force between the first movable mass and a first set of electrodes placed near the first movable mass and anchored on the substrate;

the driving feedback mechanism for the first movable mass is implemented by capacitive sensing with one or more capacitors formed by the first movable mass and a second set of electrodes placed near the first movable mass and anchored on the substrate;

the second movable mass is a movable structure suspended over the same substrate of the first movable mass and supported by a set of mechanical beams, with at least one point of each of the mechanical beams anchored on the substrate;

the driving mechanism for the second movable mass is implemented by an electrostatic force between the second movable mass and a third set of electrodes placed near the second movable mass and anchored on the substrate;

the driving feedback mechanism for the second movable mass is implemented by capacitive sensing with one or more capacitors formed by the second movable mass and a fourth set of electrodes placed near the second movable mass and anchored on the substrate;

the frequency adjustment mechanism for the second movable mass is implemented by an electrostatic force applied on the second movable mass through a fifth set of electrodes placed near the second movable mass and anchored on the substrate, with the electrostatic force having a component that is linear to the relative position of the second movable mass and the substrate;

the control loop of the circuitry is implemented by a loop that comprises at least a phase-detector, a low-pass filter, and the feedback control block that enables the second movable mass to resonate at or close to the natural resonant frequency of said second movable mass along the pre-selected axis.

\* \* \* \* \*